US008613986B2

(12) United States Patent
Um et al.

(10) Patent No.: US 8,613,986 B2
(45) Date of Patent: Dec. 24, 2013

(54) OPTICAL FILM AND INFORMATION TECHNOLOGY APPARATUS COMPRISING THE SAME

(75) Inventors: Jun-Geun Um, Daejeon (KR); Min-Hee Lee, Daejeon (KR); Nam-Jeong Lee, Daejeon (KR); Jong-Hun Lee, Daejeon (KR); Dong-Ryul Kim, Daejeon (KR); Sae-Han Cho, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 13/603,763

(22) Filed: Sep. 5, 2012

(65) Prior Publication Data

US 2013/0235456 A1    Sep. 12, 2013

Related U.S. Application Data

(63) Continuation-in-part of application No. 12/858,073, filed on Aug. 17, 2010, now abandoned, which is a continuation of application No. 12/387,553, filed on May 4, 2009, now Pat. No. 7,875,328, which is a continuation of application No. PCT/KR2009/002303, filed on Apr. 30, 2009.

(30) Foreign Application Priority Data

Apr. 30, 2008    (KR) ................... 10-2008-0040843
Jan. 9, 2009    (KR) ................... 10-2009-0002070

(51) Int. Cl.
*G02B 5/20* (2006.01)
*G02F 1/1335* (2006.01)

(52) U.S. Cl.
USPC .................... 428/1.33; 349/96; 349/122

(58) Field of Classification Search
USPC .................... 428/1.3–133; 349/96, 122
See application file for complete search history.

(56) References Cited

U.S. PATENT DOCUMENTS

| 4,419,399 | A | 12/1983 | Ichikawa et al. |
| 4,607,079 | A | 8/1986 | Giles, Jr. et al. |
| 4,727,117 | A | 2/1988 | Hallden-Abberton et al. |
| 4,877,833 | A | 10/1989 | Kondo et al. |
| 5,004,777 | A | 4/1991 | Hallden-Abberton et al. |
| 5,049,313 | A | 9/1991 | Frentzel |
| 5,200,492 | A | 4/1993 | Ohnaga et al. |
| 5,244,862 | A | 9/1993 | Bailey |

(Continued)

FOREIGN PATENT DOCUMENTS

| CN | 101087846 A | 12/2007 |
| EP | 0267574 A | 11/1987 |

(Continued)

OTHER PUBLICATIONS

JPO Website Machine English Translation of JP 2004-204208, Suzuki Minoru, Jul. 22, 2004.*

(Continued)

*Primary Examiner* — Sophie Hon
(74) *Attorney, Agent, or Firm* — Lerner, David, Littenberg, Krumholz & Mentlik, LLP

(57) ABSTRACT

The present invention relates to an optical film comprising an aromatic based unit including 5 to 10,000 of units represented by Formula 6; a (meth)acrylate-based unit which is a copolymer of a (meth)acrylate derivative and maleimide; and a styrene-based unit which is a copolymer of a styrene derivative and maleimide, and a polarizing plate.

4 Claims, 1 Drawing Sheet

(56) References Cited

U.S. PATENT DOCUMENTS

| | | | |
|---|---|---|---|
| 5,344,868 A | 9/1994 | Hallden-Abberton et al. | |
| 5,710,216 A | 1/1998 | Weber et al. | |
| 5,891,357 A | 4/1999 | Akashi et al. | |
| 5,905,554 A | 5/1999 | Kyu | |
| 5,994,022 A | 11/1999 | Tanabe et al. | |
| 6,080,833 A | 6/2000 | Otsuji et al. | |
| 6,197,898 B1 | 3/2001 | van den Berg et al. | |
| 7,704,570 B2 | 4/2010 | Takebe et al. | |
| 7,875,328 B2 | 1/2011 | Um et al. | |
| 8,344,083 B2 * | 1/2013 | Um et al. | 526/280 |
| 2002/0018163 A1 | 2/2002 | Yamamoto et al. | |
| 2002/0039651 A1 | 4/2002 | Murata | |
| 2003/0043730 A1 | 3/2003 | Uchiyama et al. | |
| 2003/0137620 A1 | 7/2003 | Wang et al. | |
| 2004/0063887 A1 | 4/2004 | Toyomasu et al. | |
| 2005/0046967 A1 | 3/2005 | Kosaka et al. | |
| 2005/0068492 A1 | 3/2005 | Itoh et al. | |
| 2005/0117099 A1 | 6/2005 | Yamaoka et al. | |
| 2005/0129895 A1 | 6/2005 | Nakamura | |
| 2006/0013967 A1 | 1/2006 | Mikoshiba et al. | |
| 2006/0055853 A1 | 3/2006 | Murakami et al. | |
| 2006/0063105 A1 | 3/2006 | Oberlander et al. | |
| 2006/0063858 A1 | 3/2006 | Kang et al. | |
| 2006/0066787 A1 | 3/2006 | Yoda et al. | |
| 2006/0066946 A1 | 3/2006 | Liu et al. | |
| 2006/0093845 A1 | 5/2006 | Chien et al. | |
| 2006/0177607 A1 | 8/2006 | Ohmori et al. | |
| 2006/0252234 A1 | 11/2006 | Saiki | |
| 2007/0141355 A1 | 6/2007 | Kosaka et al. | |
| 2007/0172181 A1 | 7/2007 | Imai et al. | |
| 2007/0282077 A1 | 12/2007 | Miyamoto et al. | |
| 2009/0197020 A1 | 8/2009 | Kim et al. | |
| 2009/0275718 A1 | 11/2009 | Um et al. | |

FOREIGN PATENT DOCUMENTS

| | | |
|---|---|---|
| EP | 0483917 A | 10/1990 |
| EP | 0483717 A2 | 5/1992 |
| EP | 0717078 A1 | 6/1996 |
| EP | 1865346 A1 | 12/2007 |
| EP | 1933181 A1 | 6/2008 |
| JP | 62-89705 A | 4/1987 |
| JP | 4146984 A | 5/1992 |
| JP | 4-266957 A | 9/1992 |
| JP | 6155932 A | 6/1994 |
| JP | 7157632 A | 6/1995 |
| JP | 08248202 A | 9/1996 |
| JP | 10-030048 A | 2/1998 |
| JP | 2000256635 A | 9/2000 |
| JP | 2001-220515 A | 8/2001 |
| JP | 2002243943 A | 8/2002 |
| JP | 2002301788 A | 10/2002 |
| JP | 2003315557 A | 11/2003 |
| JP | 2004045893 A | 2/2004 |
| JP | 2004-204208 A | 7/2004 |
| JP | 2005070534 A | 3/2005 |
| JP | 2005266464 A | 9/2005 |
| JP | 2006220726 A | 8/2006 |
| JP | 2007-031537 A | 2/2007 |
| JP | 2007046044 A | 2/2007 |
| JP | 2007112956 A | 5/2007 |
| JP | 2007169583 A | 7/2007 |
| JP | 2007169586 A | 7/2007 |
| JP | 2007263987 A | 10/2007 |
| JP | 2007321108 A | 12/2007 |
| JP | 2011509434 | 3/2011 |
| KR | 20030069461 A | 8/2003 |
| KR | 20040029251 A | 4/2004 |
| KR | 20040045790 A | 6/2004 |
| KR | 20050065154 A | 6/2005 |
| KR | 20050083709 A | 8/2005 |
| KR | 2005-23083 A | 9/2006 |
| KR | 20070003388 A | 1/2007 |
| KR | 20070113749 A | 11/2007 |
| TW | 200728838 | 8/1995 |
| TW | I304519 A | 9/2003 |
| TW | 200621817 A | 7/2006 |
| TW | 200717045 | 5/2007 |
| TW | 200732690 A | 9/2007 |
| TW | 200734392 | 9/2007 |
| WO | 03070849 A1 | 8/2003 |
| WO | 2008/001855 A1 | 1/2008 |

OTHER PUBLICATIONS

Chinese Office Action for 200980101851.2 dated Feb. 29, 2012.
Extended European Search Report (EESR) issued on Jul. 5, 2011 in the corresponding European patent application No. 09700270.
Hcengpei Wu et al: "Miscibility of Phenoxy Polymer/Polyacrylate Blends", Macromolecular Chemistry and Physics, Wiley-VCH Verlag, Weinheim, DE, vol. 197 No. 10, Oct. 1, 1996, pp. 3191-3197, XP 000634279.
International Search Report PCT/KR2009/000105, dated Aug. 26, 2009.
International Search Report PCT/KR2009/000106, dated Aug. 20, 2009.
International Search Report, PCT/KR2009/002302, dated Nov. 10, 2009.
International Search Report, PCT/KR2009/002303, dated Dec. 12, 2009.
JPO Website Machine English Translation of JP 07-304870, Matsumoto et al., Nov. 21, 1995.
JPO Website Machine English Translation of JP 2004-204208, Suzuki, Jul. 22, 2004.
Office Action from KR Application No. 10-2009-0001500, dated Feb. 8, 2011.
Office Action from KR Application No. 10-2009-0001501, dated Feb. 8, 2011.
Office Action from Taiwan for Application No. 098100472 dated Jul. 11, 2012.
Supplementary European Search Report EP 09700848, dated Mar. 18, 2011.
Supplementary European Search Report for EP09739004 dated Mar. 22, 2012.
U.S. Appl. No. 12/319,469, filed Jan. 7, 2009.
U.S. Appl. No. 12/319,471, filed Jan. 7, 2009.
U.S. Appl. No. 12/319,472, filed Jan. 7, 2009.
U.S. Appl. No. 12/387,549, filed May 4, 2009.
Young Soo Soh: "Miscibility of Polymethyl Methacrylate With Poly (Hidroxy Ether) of Bisphenol A" Journal of Applied Polymer Science, John Wiley and Sons Inc. New York, US, vol. 45, No. 10, Aug. 5, 1992, pp. 1831-1835 XP 000281210.
Office Action from Taiwan counterpart application No. 098114364 dated Aug. 24, 2012.
Extended European Search Report for Application No. EP09739003 dated Oct. 18, 2012.
Office Action from Taiwan for Application No. 098100477 dated Nov. 20, 2012.
Office Action from Taiwan for Application No. 098100475 dated Oct. 15, 2012.

* cited by examiner

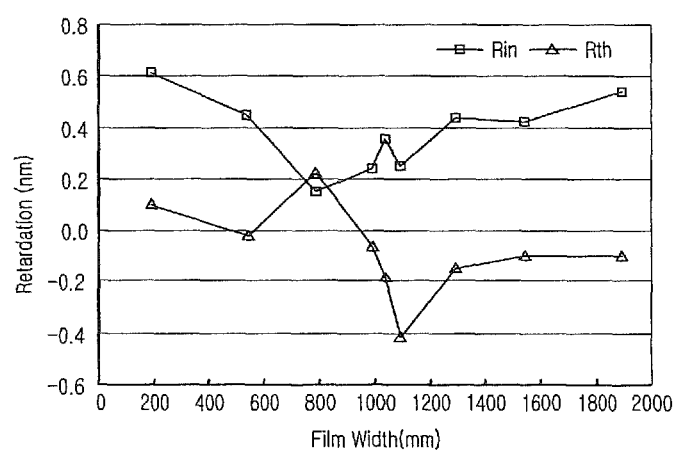

OPTICAL FILM AND INFORMATION TECHNOLOGY APPARATUS COMPRISING THE SAME

CROSS REFERENCE TO RELATED APPLICATIONS

This application is a continuation-in-part of application Ser. No. 12/858,073, filed on Aug. 17, 2010, now abandoned, which is a continuation of application Ser. No. 12/387,553, filed on May 4, 2009, now U.S. Pat. No. 7,875,328, which is a continuation of International Application No. PCT/KR2009/002303, filed on Apr. 30, 2009, which claims priority from Korean Patent Application Nos. 10-2008-0040843, filed on Apr. 30, 2008 and 10-2009-0002070, filed on Jan. 9, 2009. The disclosures of said applications are incorporated by reference herein.

TECHNICAL FIELD

The present invention relates to an optical film having excellent heat resistance and optical transparency, low haze, and excellent optical property, is not easily broken, and has excellent mechanical strength and durability, and a polarizing plate and an information technology apparatus including the same.

BACKGROUND ART

Recently, display technologies using various methods such as a plasma display panel (PDP), a liquid crystal display (LCD) and the like that are used instead of a known braun tube in accordance with the development of optical technologies are suggested and sold. The higher properties of the polymer material for displays are required. For example, in the case of the liquid crystal display, according to the development toward the thin film, the lightness, and enlargement of the picture area, the wide viewing angle, the high contrast, the suppression of change in picture color tone according to the viewing angle and the uniformity of the picture display are particularly considered as important problems.

Therefore, various polymer films such as a polarizing film, a polarizer protection film, a retardation film, a plastic substrate, a light guide plate and the like are used, and as the liquid crystal, various modes of liquid crystal displays such as twisted nematic (TN), super twisted nematic (STN), vertical alignment (VA), in-plane switching (IPS) liquid crystal cells are developed. Since these liquid crystal cells have all intrinsic liquid crystal alignment, the intrinsic optical anisotropic property is ensured, and in order to compensate the optical anisotropic property, a film in which a retardation function is provided by stretching various kinds of polymers has been suggested.

In detail, since a liquid crystal display device uses high birefringence property and alignment of liquid crystal molecules, the birefringences are different according to the viewing angle and thus the color and brightness of the picture are changed. Thus, a retardation compensation according to the kind of liquid crystal molecule is required. For example, since most liquid crystal molecules that are used in a vertical alignment manner have the thickness refractive index that is larger than the average in-plane refractive index in a liquid crystal display surface, in order to compensate this, a compensation film in which the thickness refractive index has retardation property which is smaller than the average in-plane refractive index is required.

In addition, light does not pass through the front sides of two polarizing plates that are vertical to each other, but if the angle is inclined, the light axes of two polarizing plates are not vertical to each other, thus light leakage occurs. In order to compensate this, the compensate film having the in-plane retardation is required. In addition, the display device using the liquid crystal requires both the thickness retardation compensation and the in-plane retardation compensation in order to widen the angle view.

Requirement of the retardation compensation film is to easily control the birefringence. However, the film birefringence is formed by a basic birefringence which belongs to the material and the orientation of polymer chains in the film. The orientation of the polymer chains is mostly forcibly performed by force applied from the outside or is caused by the intrinsic properties of the material, and the orientation method of the molecules by the external force is to uniaxially or biaxially stretch the polymer film.

In the related art, there is a need to develop a polymer material that satisfies the above requirement properties in order to be used in displays.

Technical Problem

It is an object of the present invention to provide an optical film having excellent optical property and optical transparency, and low haze, is not easily broken unlike an acryl-based film that is easily broken while stretching processes are carried out, and has excellent mechanical strength and processability, and durability such as heat resistance, and in particular, has a low absolute value of in-plane retardation and thickness retardation and a low absolute value of photoelasticity coefficient regardless of the stretching, and a polarizing plate and an information technology apparatus including the same.

Technical Solution

The present invention provides an optical film that comprises an aromatic based unit including 5 to 10,000 of units represented by Formula 6; a (meth)acrylate-based unit which is a copolymer of a (meth)acrylate derivative and maleimide; and a styrene-based unit which is a copolymer of a styrene derivative and maleimide.

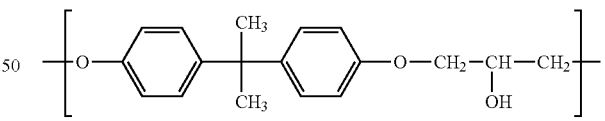

Formula 6

In addition, the present invention provides a polarizing plate that comprises a polarizer; and the optical film which is provided on at least one side of the polarizer.

Advantageous Effects

An optical film according to the present invention has excellent optical property and optical transparency, and low haze, is not easily broken unlike an acryl-based film that is easily broken while stretching and aligning processes are carried out, and has excellent mechanical strength and processability, and heat resistance, and has a low absolute value of in-plane retardation and thickness retardation and a low absolute value of photoelasticity coefficient regardless of the stretching. Accordingly, the optical film may be useful for the case of when the retardation and the photoelasticity coefficient are low like a protective film of a polarizer.

DESCRIPTION OF DRAWINGS

FIG. 1 is a graph that illustrates a retardation distribution according to a width direction of the film that is produced in Example.

BEST MODE

An optical film according to the present invention comprises an aromatic-based unit comprising chain and aromatic moiety having a hydroxyl group containing portion; and a styrene-based unit comprising one or more styrene-based derivatives, and has absolute values of in-plane retardation ($R_{in}$) and thickness retardation ($R_{th}$) of 10 nm or less and preferably 5 nm or less regardless of stretching. In addition, preferably, the optical film according to the present invention has an absolute value of photoelasticity coefficient of $3\times10^{-12}$ $m^2/N$ or less regardless of stretching.

Since the optical film according to the present invention has the small in-plane retardation and thickness retardation, the protective film of the polarizer and the optical film having the small retardation value may be usefully applied to the desired purpose. In addition, since the optical film according to the present invention has the low photoelasticity coefficient, a change in retardation value by external stress is small, such that a light leakage phenomenon may be reduced.

It is preferable that the content ratio of the aromatic-based unit and the styrene-based unit is in the range of 65 to 75:100 on the basis of mole. In addition, it is preferable that the content ratio of the aromatic-based unit and the styrene-based unit is in the range of 45 to 55:100 on the basis of weight. By the composition within the above range, it is easy to obtain the above retardation value and photoelasticity coefficient.

The optical film according to the present invention may further include a (meth)acrylate-based unit comprising one or more (meth)acrylate-based derivatives.

In addition, it is preferable that the ratio of the sum total of the contents of the aromatic-based unit and the styrene-based unit and the content of the (meth)acrylate-based unit is in the range of 1:99 to 50:50 on the basis of weight. The composition within the above range is useful to obtain the above retardation value and photoelasticity coefficient.

The (meth)acrylate-based unit comprising one or more (meth)acrylate-based derivatives, the aromatic-based unit that comprises the chain and aromatic moiety including the hydroxy group containing portion, and the styrene-based unit comprising one or more styrene-based derivatives may be each included in different compounds, or two or more units of the above units may be included in one compound.

In the present invention, the (meth)acrylate-based unit provides a weak negative in-plane retardation (Rin) and a weak thickness retardation (Rth), the aromatic-based unit comprising the chain and aromatic moiety having the hydroxy group containing portion provides a positive in-plane retardation (Rin) property and a positive thickness retardation (Rth) property, and the styrene-based unit provides a strong negative in-plane retardation (Rin) and a negative thickness retardation (Rth). Here, the negative in-plane retardation means the highest in-plane refractive index that is perpendicular in respects to the stretching direction, the positive in-plane retardation means the highest refractive index in respects to the stretching direction, the negative thickness retardation means that the thickness retardation is larger than the in-plane average refractive index, and the positive thickness retardation means that the in-plane average refractive index is larger than the thickness retardation. Because of the retardation characteristics of the above units, the retardation characteristics of the optical film may depend on the composition, the stretching direction, the stretching ratio, and the stretching method such as uniaxial or diaxial stretching of each component. Therefore, in the present invention, while a stretching process is carried out by appropriately combining the compositions of the components, an effect in which birefringences of the units offset each other may be obtained. Accordingly, in the present invention, since the film maintains an optical refractive index isotropic property, the film having the absolute values of the in-plane retardation and thickness retardation of 10 nm may be manufactured, and the optical film that hardly has the remaining retardation may be provided.

In addition, the resin composition according to the present invention is capable of providing an optical film having excellent mechanical properties unlike an acryl based film that is easily broken. In addition, the (meth)acrylate-based unit is capable of providing excellent optical properties, and the (meth)acrylate-based unit is capable of providing excellent miscibility with the compound comprising the (meth)acrylate-based unit. In addition, since the resin composition according to the present invention is capable of controlling a value of photoelasticity coefficient according to the content of the aromatic based unit having chain having the hydroxy group containing portion and aromatic portions, the film having a small change in retardation value by external stress may be manufactured.

The optical film according to the present invention may further include the cyclic-based unit having the cyclic moiety. The cyclic-based unit having the cyclic moiety may be included in at least one of the (meth)acrylate-based unit, the aromatic-based unit comprising the chain and aromatic moiety having the hydroxy group containing portion, and the styrene-based unit, and may be included in the compound that is different from the compound in which at least one of the (meth)acrylate-based unit, the aromatic-based unit comprising the chain and aromatic moiety having the hydroxy group containing portion, and the styrene-based unit is included. The cyclic-based unit having the cyclic moiety may provide excellent heat resistance to the film.

According to an embodiment of the present invention, the copolymer comprising the (meth)acrylate-based unit and the cyclic-based unit having the cyclic moiety, the copolymer comprising the (meth)acrylate-based unit and the styrene-based unit, the copolymer comprising the styrene-based unit and the cyclic-based unit having the cyclic moiety, and the copolymer comprising the (meth)acrylate-based unit, the aromatic-based unit comprising the chain and aromatic moiety having the hydroxy group containing portion, and the styrene-based unit may be used. At this time, the above copolymers may include at least one of two types or more units.

As a detailed example, the copolymer comprising the (meth)acrylate-based unit such as methyl(meth)acrylate and the cyclic-based unit such as N-cyclohexylmaleimide, that is, poly(N-cyclohexylmaleimide-co-methyl(meth)acrylate), may be used. In addition, the copolymer comprising the styrene-based unit such as styrene and cyclic-based unit such as maleimide may be used. In addition, the copolymer comprising methyl methacrylate as the (meth)acrylate-based unit, styrene and alpha methyl styrene as the styrene-based unit, and N-cyclohexylmaleimide as the cyclic-based unit may be used. In addition, the copolymer comprising methyl methacrylate as the (meth)acrylate-based unit, styrene or alpha methyl styrene as the styrene-based unit, and N-cyclohexylmaleimide or N-phenylmaleimide as the cyclic-based unit may be used. However, the above examples are set forth to illustrate the present invention, but are not to be construed to limit the present invention.

The content of each unit is not particularly limited, and in consideration of the role of each component, in order to obtain desired in-plane retardation, thickness retardation, optical property, mechanical property, transparency, miscibility and the like, the content of each unit may be determined. For example, the contents of the (meth)acrylate-based unit, an aromatic based resin having chain having the hydroxy group containing portion and aromatic moiety, the styrene-based unit and the cyclic-based unit may be selected within the range of about 0.1 to 99 wt %. In detail, it is preferable that the content of the (meth)acrylate-based unit is in the range of about 50 to 98 wt %, it is preferable that the content of an aromatic based resin having chain having the hydroxy group containing portion and aromatic moiety is in the range of about 0.5 to about 40 wt %, and it is preferable that the content of the styrene-based unit is in the range of about 0.5 to about 30 wt %. It is preferable that the content of the cyclic-based unit may is in the range of about 0.5 to about 45 wt %.

In the present invention, the compound comprising the (meth)acrylate-based unit, the aromatic based unit having chain having the hydroxy group containing portion and aromatic moiety, the styrene-based unit and the cyclic-based unit may be a homopolymer or a copolymer, and the compound may further include units other than the (meth)acrylate-based unit, the aromatic based unit having chain having the hydroxy group containing portion and aromatic moiety, the styrene-based unit and the cyclic-based unit within the scope of the present invention. The copolymer may be a random or block copolymer.

In the present invention, it should be understood that the (meth)acrylate-based unit may include (meth)acrylate and a (meth)acrylate derivative. To be specific, as the (meth)acrylate based monomer, there are methyl methacrylate, methyl acrylate, ethyl acrylate, butyl acrylate, 2-ethylhexyl methacrylate, lauryl methacrylate, benzyl methacrylate and the like, but it is not limited thereto. In particular, it is most preferable that methyl methacrylate (MMA) is used.

In the present invention, as the compounds comprising the (meth)acrylate-based unit, a copolymer comprising the (meth)acrylate based unit and the cyclic based unit having the cyclic moiety may be used. The content of the (meth)acrylate based unit in the copolymer comprising the (meth)acrylate based unit and the cyclic based unit having the cyclic moiety is in the range of about 50 to 99% by weight, and preferably in the range of about 70 to about 98% by weight, and the content of the cyclic based unit having the cyclic moiety is in the range of about 1 to 50% by weight and preferably about 2 to about 30% by weight. When the content of the cyclic based unit having the cyclic moiety is 50% by weight or less, it is useful to reduce a haze value of the film.

The cyclic based unit having the cyclic moiety of the copolymer comprising the (meth)acrylate based unit and the cyclic based unit having the cyclic moiety functions to improve heat resistance of the film. Examples of the cyclic based unit having the cyclic moiety will be described below. However, it is most preferable that the cyclic based unit having the cyclic moiety, which is included in the copolymer in conjunction with the (meth)acrylate based unit, is a maleimide based unit including a maleimide portion. The maleimide based unit may include a cyclic moiety that is derived from N-cyclohexylmaleimide, N-phenylmaleimide, N-methylmaleimide, N-butylmaleimide and the like, but is not limited thereto. In particular, it is most preferable that it includes the cyclic moiety that is derived from N-cyclohexylmaleimide.

The copolymer comprising the (meth)acrylate based unit and the cyclic based unit having the cyclic moiety may be manufactured by a method such as a bulk polymerization, a solution polymerization, a suspension polymerization, an emulsion polymerization and the like using a (meth)acryl based monomer and a cyclic based monomer such as a maleimide based monomer.

In the present invention, it is preferable that the number average molecular weight of the aromatic based unit having chain having the hydroxy group containing portion and aromatic moiety comprising the chain having the hydroxy group containing portion and aromatic moiety is in the range of 1,500 to 2,000,000 g/mol. It is preferable that the aromatic based resin includes the phenoxy based resin. Here, the phenoxy based resin includes a structure in which at least one oxygen radical is bonded to the benzene cycle. For example, the aromatic based unit having chain having the hydroxy group containing portion and aromatic moiety having the chain having the hydroxy group containing portion and aromatic moiety may include one or more units that are represented by the following Formula 1. The aromatic based unit having chain having the hydroxy group containing portion and aromatic moiety includes 5 to 10,000 of the unit of the following Formula 1, preferably 5 to 7,000 of the unit of the following Formula 1, and more preferably 5 to 5,000 of the unit of the following Formula 1. In the case when two kinds or more units of the following Formula 1 are included in the aromatic based unit having chain having the hydroxy group containing portion and aromatic moiety, they may be included in a random form, an alternating form, or a block form.

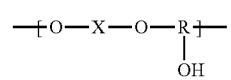

Formula 1 wherein X is a divalent group comprising at least one benzene cycle and R is a straight- or branched-chained alkylene group having 1 to 6 carbon atoms.

To be specific, it is preferable that X is a divalent group that is derived from the compounds of the following Formulas 2 to 4, but is not limited thereto.

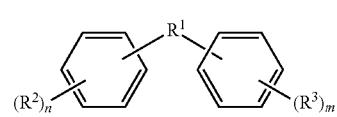

Formula 2

$R^1$ is a direct bond, straight- or branched-chained alkylene having 1 to 6 carbon atoms, or cycloalkylidene having 3 to 20 carbon atoms, $R^2$ and $R^3$ are each hydrogen, straight- or branched-chained alkyl having 1 to 6 carbon atoms, or straight- or branched-chained alkenyl having 2 to 6 carbon atoms, and n and m are each an integer in the range of 1 to 5.

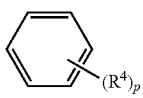
Formula 3

$R^4$ is each hydrogen, straight- or branched-chained alkyl having 1 to 6 carbon atoms, or straight- or branched-chained alkenyl having 2 to 6 carbon atoms, and p is an integer in the range of 1 to 6.

Formula 4

$R^6$ and $R^7$ are each a direct bond, straight- or branched-chained alkylene having 1 to 6 carbon atoms, or cycloalkylidene having 3 to 20 carbon atoms, $R^5$ and $R^8$ are each hydrogen, straight- or branched-chained alkyl having 1 to 6 carbon atoms, or straight- or branched-chained alkenyl having 2 to 6 carbon atoms, and q and r are each an integer in the range of 1 to 5.

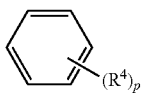
Formula 3

$R^4$ is each hydrogen, straight- or branched-chained alkyl having 1 to 6 carbon atoms, or straight- or branched-chained alkenyl having 2 to 6 carbon atoms, and p is an integer in the range of 1 to 6.

Formula 4

$R^6$ and $R^7$ are each a direct bond, straight- or branched-chained alkylene having 1 to 6 carbon atoms, or cycloalkylidene having 3 to 20 carbon atoms, $R^5$ and $R^8$ are each hydrogen, straight- or branched-chained alkyl having 1 to 6 carbon atoms, or straight- or branched-chained alkenyl having 2 to 6 carbon atoms, and q and r are each an integer in the range of 1 to 5.

Detailed examples of the compounds that are represented by Formulas 2 to 4 are the same as the following compounds, but are not limited thereto.

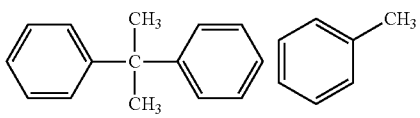

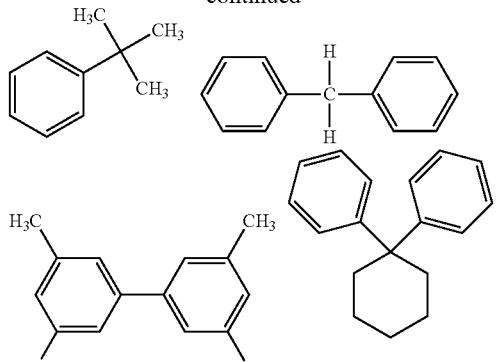

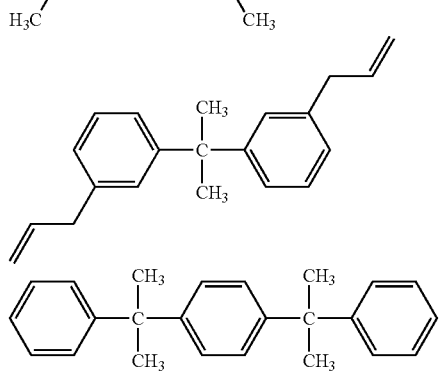

It is most preferable that the aromatic based unit includes one kind or more 5 to 10,000 phenoxy based units that are represented by the following Formula 5.

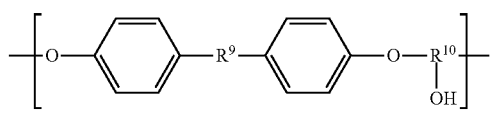
Formula 5 wherein $R^9$ is a direct bond, straight- or branched-chained alkylene having 1 to 6 carbon atoms, and $R^{10}$ is a direct bond, straight- or branched-chained alkylene having 1 to 6 carbon atoms.

It is preferable that Formula 5 is represented by the following Formula 6.

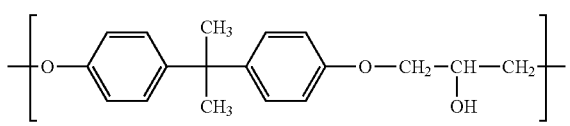
Formula 6

An end of the aromatic based resin may be an OH group.

In the present invention, the styrene-based unit is construed to include the styrene-based derivative as well as styrene. The styrene-based derivative includes a compound comprising one or more substituent groups having aliphatic hydrocarbons or hetero atoms at a benzene cycle or vinyl group of styrene, and in detail, it includes alpha methyl styrene.

In the present invention, as the compound comprising the unit, the copolymer comprising the styrene-based unit and the cyclic moiety may be used. The content of the styrene-based unit in the copolymer comprising the styrene-based unit and the cyclic-based unit having the cyclic moiety is in the range of about 1 to about 99 wt %, preferably in the range of about 30 to about 99 wt %, and more preferably in the range of about 40 to about 95 wt %, and the content of the cyclic-based unit having the cyclic moiety is in the range of about 1 to about 99 wt %, preferably in the range of about 1 to about 70 wt %, and more preferably in the range of about 5 to about 60 wt %. By melting and mixing the copolymer comprising the styrene-based unit and the cyclic-based unit having the cyclic moiety and using it, the adhesion property and heat resistance of the film may be improved. If the content of the cyclic-based unit having the cyclic moiety is very low, the miscibility may be slightly reduced. Examples of the cyclic-based unit having the cyclic moiety will be described later. However, it is most preferable that the cyclic-based unit having the cyclic moiety that is included in the copolymer in conjunction with the cyclic-based unit is a maleic anhydride-based unit including a maleic anhydride portion, or a maleimide based unit. The maleimide based unit may include a cyclic moiety that is derived from N-cyclohexylmaleimide, N-phenylmaleimide, N-methylmaleimide, N-butylmaleimide and the like, but is not limited thereto. In particular, it is most preferable that it includes the cyclic moiety that is derived from N-phenylmaleimide.

In the present invention, the cyclic-based unit may improve the heat resistance of the film. The content of the cyclic-based unit is in the range of about 0.1 to about 99 wt %, and preferably about 0.5 to about 45 wt %. Examples of the cyclic moiety of the cyclic-based unit include maleic anhydride, maleimide, glutaric anhydride, glutalimide, lactone and lactame, but are not limited thereto.

According to an embodiment of the present invention, as the components that include the units, 1) a copolymer comprising the (meth)acrylate based unit and the maleimide based unit, 2) the resin comprising the phenoxy based (phenoxy-based) unit, and 3) the copolymer comprising the styrene-based unit and the maleimide based unit may be used. In this case, it is preferable that the content of each component is in the range of 1 to 99 wt %. To be specific, the content of 1) the copolymer is preferably in the range of about 50 to about 99 wt % and more preferably in the range of about 75 to about 98 wt %. The content of the 2) resin is preferably in the range of about 0.5 to about 40 wt % and more preferably in the range of about 1 to about 30 wt %. The content of 3) the copolymer is preferably in the range of about 0.5 to about 30 wt % and more preferably in the range of about 1 to about 20 wt %.

In particular, in the case when the content of the maleimide based monomer in the copolymer comprising 1) the (meth)acrylate based unit and maleimide based unit is 50% by weight or less, regardless of the mixing ratio of 1) to 2) components, it can show miscibility in respects to the entire range, and the optical film having the resin composition is advantageous in that it has a single glass transition temperature $T_g$.

The thickness of the optical film according to the present invention is in the range of 5 to 500 μm, and more preferably 5 to 300 μm, but is not limited thereto. The transmittance of the optical film is 90% or more, the haze is 2.5% or less, preferably 1% or less, and more preferably 0.5% or less. It is preferable that the glass transition temperature of the optical film according to the present invention is 100° C. or more.

The optical film may control the value of the photoelasticity coefficient at a very small value according to the content of the aromatic based unit having chain having the hydroxy group containing portion and aromatic moiety and the styrene-based unit, and in this case, a characteristic in which a change in retardation caused by the external stress hardly occurs is ensured, such that a light leakage phenomenon may be reduced.

The method for manufacturing the optical film according to the present invention comprises the steps of preparing the above resin composition; and shaping a film by using the resin composition. The manufacturing method may further comprise the step of uniaxially or biaxially stretching the film.

The resin composition may be manufactured by melting and blending the above components. The melting and the mixing of the components may be carried out by using an extruder.

The resin composition may further include a lubricant, an antioxidant, a UV stabilizer, a thermal stabilizer and the like that are generally used.

When the optical film according to the present invention is manufactured, a method that is known in the art may be used, and in detail, an extrusion molding method may be used. For example, after the resin composition is dried under a vacuum and removes water and dissolved oxygen, the composition is supplied from the raw material hopper to a single or twin extruder that is filled with nitrogen, and melted at a high temperature to obtain a raw material pellet, the obtained raw material pellet is dried under a vacuum, melted from the raw material hopper to a single extruder that is substituted with nitrogen, passes through a coat hanger type T-die, and a chrome-coated casting roll and a drying roll to manufacture the film.

When the optical film according to the present invention is manufactured, the manufacturing method may further comprise the step of uniaxially or biaxially stretching the film. The stretching process may be carried out by using any one of a longitudinal direction (MD) stretching and a transverse direction (TD) stretching or both of the longitudinal direction stretching and the transverse direction stretching. In the case of when both of the longitudinal direction stretching and the transverse direction stretching are carried out, any one of them may be first carried out and then the other may be carried out, or both of them may be carried out simultaneously. The stretching may be carried out through a single step or through multi-steps. In the case of when the stretching is carried out in the longitudinal direction, the stretching may be carried out by using a difference in speed between rolls, and in the case of when the stretching is carried out in the transverse direction, the tenter may be used. The rail initiating angle of the tenter is 10° or less, a bowing phenomenon that occurs when the transverse direction stretching is carried out is suppressed, and the angle of the optical axis is regularly controlled. By carrying out the transverse direction stretching through multi-steps, the suppression phenomenon of the bowing phenomenon may be obtained.

The stretching may be carried out at a temperature in the range of (Tg−20° C.) to (Tg+30° C.) when the glass transition temperature of the resin composition is $T_g$. The glass transition temperature means a range from a temperature at which storage elasticity of the resin composition starts to be reduced and the loss elasticity starts to be larger than the storage elasticity to a temperature at which alignment of the polymer chain is loosened and removed. The glass transition temperature may be measured by using a differential scanning calorimeter (DSC).

In the case of a small stretching machine (Universal testing machine, Zwick Z010), it is preferable that the stretching rate is in the range of 1 to 100 mm/min. In the case of a pilot stretching machine, it is preferable that the stretching rate is in the range of 0.1 to 2 mm/min. In addition, it is preferable that the film is stretched by using a stretching ratio in the range of 5 to 300%.

The stretching may be carried out through a separate step that is different from the shaping of the film, or carried out through one step in the same process as the shaping of the film.

The composition of each unit may be combined with the longitudinal direction stretching ratio, the transverse direction stretching ratio, the stretching temperature and the stretching rate.

In addition, since toughness of the stretched film is increased, a disadvantage of the (meth)acrylate based film that is easily broken may be effectively compensated.

The optical film according to the present invention has the absolute value of in-plane retardation and thickness retardation of 10 nm or less and preferably 5 nm or less regardless of the stretching. In addition, the optical film according to the present invention has the absolute value of photoelasticity coefficient of $3 \times 10^{-12}$ m$^2$/N or less regardless of the stretching.

The optical film according to the present invention may be provided with an additional layer comprising at least one of an organic substance and an inorganic substance on at least one side, and an adhesion property in respects to a retardation value, a compensation property and/or a polarizer may be controlled. Examples of the organic substance include cellulose, polyimide, polyester, polyurethane, liquid crystal and/or a derivative thereof, and examples of the inorganic substance include $TiO_2$, ITO and the like, but are not limited thereto.

In addition, the present invention provides a polarizing plate that comprises a polarizer, and the optical film which is provided on at least one side of the polarizer.

Since a polarizer comprises a dichromic pigment and consists of a polyvinyl alcohol film that is uniaxially stretched, it is very weak and has the reduced durability in respects to the temperature or moisture, and laminated with the protective film. In the related art, a liquid crystal display device having the polarizing plate mostly consists of a device having a relatively small display area, such as clocks or instrument boards, or a light diffusion type device, a surface of which is subjected to reflection prevention treatment. Currently, a liquid crystal display device has a large display area like a display having a large image or has a surface that is subjected to low haze reflection prevention treatment, such as polished surfaces, by using a multilayered reflection way. In this case, defects such lines, curve marks, scars, stains and the like formed on the surface of the protective film for polarizing plate are observed. This is because the most protective film for polarizing plate uses triacetylcellulose films.

A cellulose derivative has excellent moisture permeation, in a process for manufacturing the polarizing plate, it is advantageous in that moisture contained in the polarizer may be volatilized through the film. However, under the high temperature and high humidity atmosphere, the dimensional change according to the absorption or the optical property change is relatively significant and in the case of when the humidity is changed at around room temperature, a change in retardation value is large, and there is a limit in improvement of the stable angle view, thus there is a problem in that the durability of the optical property of the polarizing plate is reduced.

In addition, in a polycarbonate-based, since the glass transition temperature is high, the stretching process is required at high temperatures, and since the light elasticity-coefficient of the film is large, light deformation occurs by the stress. In the case of when the norbornene-based film is stretched, there are problems in that the stress is increased in the stretching or the stress nonuniformity occurs in the stretching. The solving of the above problems is capable of being solved by adopting the acryl-based retardation film having the excellent angle view compensation effect and a small change in retardation value even though the environment is changed.

If the photoelasticity coefficient, that is, the change rate of birefringence when a stress load is received is high, since adhesion nonuniformity when adhesion is carried out in conjunction with a liquid crystal layer or a polarizing plate, a difference between thermal expansions of constituent materials formed by receiving heat from a backlight or an external environment, and a change in retardation that is caused by an effect of stress generated by shrinkage of a polarizing film and the like are increased, color uniformity of the display device is reduced or contrast is reduced. The acryl-based film may control the value of the photoelasticity coefficient at a very small value, and in this case, a characteristic in which a change in retardation caused by the external stress hardly occurs is ensured, such that a light leakage phenomenon may be reduced.

The optical film according to the present invention may be provided on one side of the polarizer or on both sides of the polarizer.

In the case of when the optical film according to the present invention is provided on only any one side of the polarizer, a protective film that is known in the art may be provided on the other side thereof. As the protective film that is known in the art, a triacetate cellulose (TAC) film, a polynorbonene-based film that is produced by using a ring opening metathesis polymerization (ROMP), a HROMP (ring opening metathesis polymerization followed by hydrogenation) polymer film that is obtained by hydrogenating the ring opening cyclic olefin-based polymer again, a polyester film, a polynorbonene-based film that is produced by the addition polymerization and the like may be used. In addition to this, a film that is produced by using a transparent polymer material may be used as the protective film, but not limited thereto.

As the polarizer, a film that consists of polyvinyl alcohol (PVA) comprising iodine or a dichromic dye may be used. The polarizing film may be produced by dyeing iodine or the dichromic dye on the PVA film, but the production method thereof is not particularly limited thereto. In the present specification, the polarizing film means a state that does not comprise the protective film, and the polarizing plate means a state that comprises the polarizing film and the protective film.

In the present invention, the protection film and the polarizer may be combined by using the method that is known in the art.

In addition, the present invention provides a liquid crystal display that comprises the polarizing plate. For example, the liquid crystal display device according to the present invention is a liquid crystal display device comprising a liquid crystal cell and a first polarizing plate and a second polarizing plate that are provided on both sides of the liquid crystal cell, and at least one of the first polarizing plate and the second polarizing plate is the polarizing plate according to the present invention. It is preferable that the optical film or the polarizer protective film that are provided on the side that is opposite to the liquid crystal cell of the polarizing plate includes a UV absorbing agent.

In addition, the present invention provides an information electronic device comprising the optical film. Examples of the information electronic device include display devices such as a liquid crystal display (LCD), an organic light emitting diode (OLED) and the like.

In one embodiment, the liquid crystal display according to the present invention is a liquid crystal display device comprising a liquid cell, and a first polarizing plate and a second polarizing plate that are provided on both sides of the liquid crystal cell, and between at least one of the first polarizing plate and the second polarizing plate and the liquid crystal cell, the optical film according to the present invention may be provided. That is, between the first polarizing plate and the liquid crystal cell, between the second polarizing plate, and the liquid crystal cell, or both between the first polarizing plate and the liquid crystal cell and between the second polarizing plate and the liquid crystal cell, one or more optical films according to the present invention may be provided.

MODE FOR INVENTION

Hereinbelow, the present invention will be described in detail with reference to Examples. The present invention may, however, be embodied in many different forms and should not be construed as being limited to the Examples set forth herein.

EXAMPLES

Example 1

A resin composition in which a poly(N-cyclohexylmaleimide-co-methylmethacrylate) resin, a styrene-N-phenylmaleimide copolymer resin (hereinafter, referred to as "SPhMI) and a phenoxy-based resin were uniformly mixed with each other at a weight ratio of 80:10:10 was provided to a 24ϕ extruder in which nitrogen was substituted from the raw material hopper to the extruder, and melted at 250° C. to manufacture the raw material pellet.

As the phenoxy-based resin, PKFE (Mw=60,000, Mn=16,000, and Tg=95° C.) manufactured by InChemRez®, Co., Ltd. was used, and the styrene-N-phenylmaleimide copolymer resin formed by suspension-polymerizing styrene and N-phenylmaleimide in a composition rate of 95:5 wt % was used. IH830HR resin that was manufactured by LGMMA, Co., Ltd. was used as the poly(N-cyclohexylmaleimide-co-methylmethacrylate) resin, and the content of N-cyclohexylmaleimide was 6.5 wt % which was analyzed by using the NMR.

The obtained raw material pellets were dried in the vacuum, melted at 260° C. by using the extruder, and passed through the coat hanger type of T-die, the chrome-coated casting roll and the dry roll to manufacture the film that had the thickness of 200 μm. This film was stretched by using the pilot stretching device at 125° C. in the MD direction using a difference between speeds of rolls at the ratios described in the following Table 1, and stretched in the TD direction at 125° C. by using the tenter at the ratios described in the following Table 1 to manufacture the film. The in-plane retardation value and the thickness retardation of the film are described in the following Table 1. In addition, the retardation distribution according to the width direction is shown in FIG. 1.

TABLE 1

| MD stretching | TD stretching | Retardation value (nm) Rin | Retardation value (nm) Rth | Thickness (μm) |
|---|---|---|---|---|
| 100% | 100% | 1.0 | 0.5 | 53 |
| 150% | 100% | 1.2 | 0.9 | 44 |
| 150% | 200% | 1.4 | 0.4 | 29 |

TABLE 1-continued

| MD stretching | TD stretching | Retardation value (nm) Rin | Retardation value (nm) Rth | Thickness (μm) |
|---|---|---|---|---|
| 150% | 250% | 1.9 | −0.1 | 24 |
| 170% | 200% | 1.6 | −0.2 | 26 |
| 170% | 250% | 1.4 | −0.1 | 21 |

Example 2

A resin composition in which a poly(N-cyclohexylmaleimide-co-methylmethacrylate) resin, a styrene-N-phenylmaleimide copolymer resin (SPhMI) and a phenoxy-based resin were uniformly mixed with each other at a weight ratio of 80:10:10 was provided to a 24ϕ extruder in which nitrogen was substituted from the raw material hopper to the extruder, and melted at 250° C. to manufacture the raw material pellet.

The obtained raw material pellets were dried in the vacuum, melted at 260° C. by using the extruder, and passed through the coat hanger type of T-die, the chrome-coated casting roll and the dry roll to manufacture the film that had the thickness of 150 μm. This film was stretched by using the pilot stretching device at 125 to 140° C. in the MD direction using a difference between speeds of rolls at the ratio of 170% described in the following Table 2, and stretched in the TD direction at 125 to 140° C. by using the tenter at the ratio of 250% described in the following Table 2 to manufacture the film. The in-plane retardation value and the thickness retardation of the film are described in the following Table 2.

TABLE 2

| Stretching temperature (° C.) | MD stretching ratio | TD stretching ratio | retardation value (nm) Rin | retardation value (nm) Rth |
|---|---|---|---|---|
| 125 | 170% | 250% | 1.4 | −0.1 |
| 130 | 170% | 250% | 1.1 | 0.6 |
| 135 | 170% | 250% | 0.6 | 0.8 |
| 140 | 170% | 250% | 0.5 | 0.9 |

Examples 3 to 5 and Comparative Examples 1 to 3

As a poly(N-cyclohexylmaleimide-co-methylmethacrylate) resin, IE830HR resin that was manufactured by LGMMA, Co., Ltd. was used, as a phenoxy-based resin, InChemRez Phenoxy PKFE® resin that was the phenoxy resin manufactured by InChem Corporation was used, and a styrene-N-phenylmaleimide copolymer resin formed by suspension-polymerizing styrene and N-phenylmaleimide in a composition rate of 95:5 wt %, was used to manufacture the film by using the same method as Example 1 and measure physical properties thereof. The composition and physical properties of the film are described in the following Tables 3 and 4.

TABLE 3

| | Parts by weight | | | wt % | | | Mol | | Mole ratio | Tg |
|---|---|---|---|---|---|---|---|---|---|---|
| | HR | SPhMI | PKFE | HR | SPhMI | PKFE | Styrene | PKFE | PKFE/St | (° C.) |
| Example 3 | 100 | 8 | 8 | 91.0 | 4.5 | 4.5 | 0.07 | 0.02 | 0.34 | 124 |
| Example 4 | 100 | 8 | 10 | 86.6 | 6.7 | 6.7 | 0.07 | 0.03 | 0.42 | 125 |
| Example 5 | 100 | 10 | 8 | 80.4 | 9.8 | 9.8 | 0.08 | 0.02 | 0.27 | 125 |
| Comparative Example 1 | 100 | 0 | 0 | 100.0 | 0 | 0 | — | — | — | 123 |
| Comparative Example 2 | 100 | 5 | 10 | 87.0 | 4.3 | 8.7 | 0.04 | 0.03 | 0.67 | 119 |
| Comparative Example 3 | 100 | 10 | 5 | 87.0 | 8.7 | 4.3 | 0.08 | 0.01 | 0.17 | 126 |

TABLE 4

| | MD stretching | | TD stretching | | Retardation (nm) | | Photoelasticity coefficient |
|---|---|---|---|---|---|---|---|
| | Stretching Temperature | Stretching ratio | Stretching Temperature | Stretching ratio | Rin | Rth | |
| | (° C.) | (%) | (° C.) | (%) | | | (×10$^{-12}$ m$^2$/N) |
| Example 3 | 120 | 25 | 120 | 50 | 1.6 | 1.9 | 0.9 |
| Example 4 | 120 | 25 | 120 | 50 | 2.8 | −3.2 | 1.6 |
| Example 5 | 120 | 25 | 120 | 50 | 2.5 | 3.9 | 2.1 |
| Comparative Example 1 | 125 | 25 | 150 | 50 | 26 | 32 | 3.9 |
| Comparative Example 2 | 120 | 25 | 120 | 50 | 35 | −46 | 6.4 |
| Comparative Example 3 | 120 | 25 | 120 | 50 | 52 | 67 | 5.8 |

As seen from the above Examples, in the optical film according to the present invention, the absolute value of each of in-plane retardation, thickness retardation and photoelasticity coefficient is almost 0 before and after the stretching.

While the present invention has been shown and described in connection with the embodiments, it will be apparent to those skilled in the art that modifications and variations can be made without departing from the spirit and scope of the invention as defined by the appended claims.

The invention claimed is:

1. An optical film comprising:
an aromatic-based unit including 5 to 10,000 of units represented by Formula 6;
a (meth)acrylate-based unit which is a copolymer of a (meth)acrylate derivative and maleimide; and
a styrene-based unit which is a copolymer of a styrene derivative and maleimide:

Formula 6

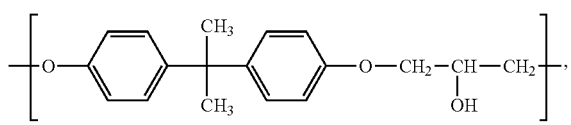

wherein a content of the copolymer of the (meth)acrylate derivative and maleimide is in a range of about 50% to about 99% on the basis of a weight of resin, a content of the aromatic-based unit is in a range of about 0.5% to about 40% on the basis of the weight of resin, and a content of the copolymer of the styrene derivative and maleimide is in a range of about 0.5% to about 30% on the basis of the weight of resin, and wherein in the optical film, regardless of stretching, an absolute value of photoelasticity coefficient is $3 \times 10^{-12}$ m$^2$/N or less.

2. The optical film of claim 1, wherein in the optical film, absolute values of in-plane retardation ($R_{in}$) and thickness retardation ($R_{th}$) defined by the following Equation, regardless of stretching, are 10 nm or less, $$R_{in}=(n_x-n_y) \times d, R_{th}=[(n_x+n_y)/2-n_z] \times d$$

where $n_x$ is a largest refractive index among in-plane refractive indexes of the film,
$n_y$ is a refractive index in a direction that is vertical to $n_x$ of the in-plane refractive index of the film,
$n_z$ is a thickness refractive index of the film, and
d is a thickness of the film.

3. The optical film of claim 1, wherein the optical film is a protective film for a polarizer.

4. A polarizing plate comprising:
a polarizer; and
the optical film of claim 1, which is provided on at least one side of the polarizer.

* * * * *